(12) United States Patent
Dahal

(10) Patent No.: US 11,227,053 B2
(45) Date of Patent: Jan. 18, 2022

(54) MALWARE MANAGEMENT USING I/O CORRELATION COEFFICIENTS

(71) Applicant: MICRO FOCUS LLC, Santa Clara, CA (US)

(72) Inventor: Manoj Dahal, Bangalore (IN)

(73) Assignee: Micro Focus LLC, Santa Clara, CA (US)

(*) Notice: Subject to any disclaimer, the term of this patent is extended or adjusted under 35 U.S.C. 154(b) by 201 days.

(21) Appl. No.: 16/709,300

(22) Filed: Dec. 10, 2019

(65) Prior Publication Data

US 2021/0173930 A1    Jun. 10, 2021

(51) Int. Cl.
| | |
|---|---|
| *G06F 21/55* | (2013.01) |
| *G06F 21/56* | (2013.01) |
| *H04L 29/06* | (2006.01) |
| *G06N 20/00* | (2019.01) |

(52) U.S. Cl.
CPC ......... *G06F 21/566* (2013.01); *G06F 21/554* (2013.01); *G06N 20/00* (2019.01); *H04L 63/145* (2013.01); *H04L 63/1416* (2013.01); *G06F 2221/033* (2013.01)

(58) Field of Classification Search
CPC .......... G06F 21/566; G06F 21/554; G06F 2221/033; G06F 21/552; H04L 63/1416; H04L 63/145

See application file for complete search history.

(56) References Cited

U.S. PATENT DOCUMENTS

| | | | | |
|---|---|---|---|---|
| 8,181,247 | B1* | 5/2012 | Pavlyushchik | G06F 21/566 726/22 |
| 10,530,788 | B1* | 1/2020 | Kinger | H04L 63/1416 |
| 2014/0053267 | A1* | 2/2014 | Klein | G06F 21/566 726/23 |
| 2016/0294851 | A1* | 10/2016 | Langton | H04L 43/0876 |
| 2017/0195347 | A1* | 7/2017 | Hay | G06F 21/53 |
| 2017/0300690 | A1* | 10/2017 | Ladnai | G06F 21/554 |
| 2018/0034835 | A1 | 2/2018 | Elad | |
| 2018/0288087 | A1 | 10/2018 | Hittel et al. | |
| 2018/0357416 | A1 | 12/2018 | Ashkenazi et al. | |
| 2019/0042744 | A1 | 2/2019 | Rajasekharan et al. | |

(Continued)

FOREIGN PATENT DOCUMENTS

| | | |
|---|---|---|
| CN | 106096397 A | 11/2016 |
| KR | 101765211 B1 | 8/2017 |

(Continued)

OTHER PUBLICATIONS

A Behavioural based approach to ransomware detection; Daniel Nieuwenhuizen; 20 pages; 2017.

(Continued)

*Primary Examiner* — Christopher C Harris

(57) ABSTRACT

A malware attack is detected in a computing system by monitoring file I/O and coordinated network I/O traffic and referencing criteria including a correlation coefficient calculated relative to the I/O. If the file I/O and coordinated network I/O was initiated by an executing process that meets criteria indicative of malware, a correlation coefficient is calculated with respect to the file I/O and coordinated network I/O. The executing process is identified as malware if a threshold criteria is met that considers the correlation coefficient.

20 Claims, 4 Drawing Sheets

(56) References Cited

U.S. PATENT DOCUMENTS

2019/0163900 A1    5/2019  Zhang et al.
2019/0303573 A1   10/2019  Chelarescu et al.
2020/0097653 A1*  3/2020  Mehta ...................... G06N 3/08

FOREIGN PATENT DOCUMENTS

| | | |
|---|---|---|
| KR | 101859823 B1 | 6/2018 |
| KR | 20190074840 A | 6/2019 |
| WO | WO-W02019039730 A1 | 2/2019 |

OTHER PUBLICATIONS

Ransomware early detection by the analysis of file sharing traffic; Daniel Morato et al.; 20 pages; Sep. 2018.

* cited by examiner

MALWARE MANAGEMENT USING I/O CORRELATION COEFFICIENTS

BACKGROUND

Malware is generally defined as software that is specifically designed to disrupt, damage, or gain unauthorized access to or control of a computer system, or to steal or corrupt data or generally do other nefarious things to the computer system or its files or data. Examples of malware may be in the form of a virus, trojan, worm, adware, spyware, rootkit, or ransomware. A software vulnerability is any weakness in software or in an operating system (OS) that may be exploited to disrupt, damage, or gain unauthorized access to or control of the software or computer system, or compromise or cause unintended behavior of the software or computer system. Vulnerabilities are often exploited by attackers to inject malware or otherwise gain control of or disrupt a computer system.

Ransomware is notorious because it is designed to block access to a computer system, or its files or data, or reveal confidential data, unless a sum of money is paid by the victim to the attacker. Ransomware often encrypts a computer system's files, and the attacker demands a ransom payment to restore access to the data which may occur by the victim obtaining the mathematical decryption key known only to the attacker. Ransomware may cripple a business by denying it access to its system or data, thus forcing it to pay a potentially costly sum.

Procedures commonly recommended to help in preventing a malware attack include maintaining updated operating systems and software applications, backing up files and data, avoiding installing untrusted applications, avoiding selecting on untrusted web links, and using appropriate antivirus, whitelisting, and other malware detection software. However, even by taking these standard precautions, malicious attackers change malware so quickly that it is nearly impossible to recognize and prevent attacks from new versions or slight variations of the malware, or completely new malware, until it is too late.

DETAILED DESCRIPTION

This document describes example methods, devices, systems, and procedures to detect and protect computer systems from malware attacks, and particularly ransomware, based on a correlation between file input/output (I/O) and coordinated network I/O traffic. File I/O and network I/O are monitored to detect if such I/O meets initial criteria indicative of the executing process being malware. Such initial criteria may include detecting abnormal file I/O and coordinated network I/O, as well as detecting that the executing process program source file was recently created. A machine learning model, such as a clustering technique, is applied to the computing system to identify system-normal file I/O and coordinated network I/O. If a monitored file I/O and coordinated network I/O are detected as abnormal I/O activity relative to the machine learning model, and the program source file was recently created, then at least one correlation coefficient is calculated with respect to the file I/O and network I/O traffic. If a threshold criteria is met including considering the correlation coefficient, then it is determined that a malware or ransomware attack is targeting the computing system. Remediation activity may include blocking new files from being opened by the executing malware process, blocking transmission of data to the network endpoint associated with the I/O, and/or notifying distributed nodes of the attack.

Figure 1:
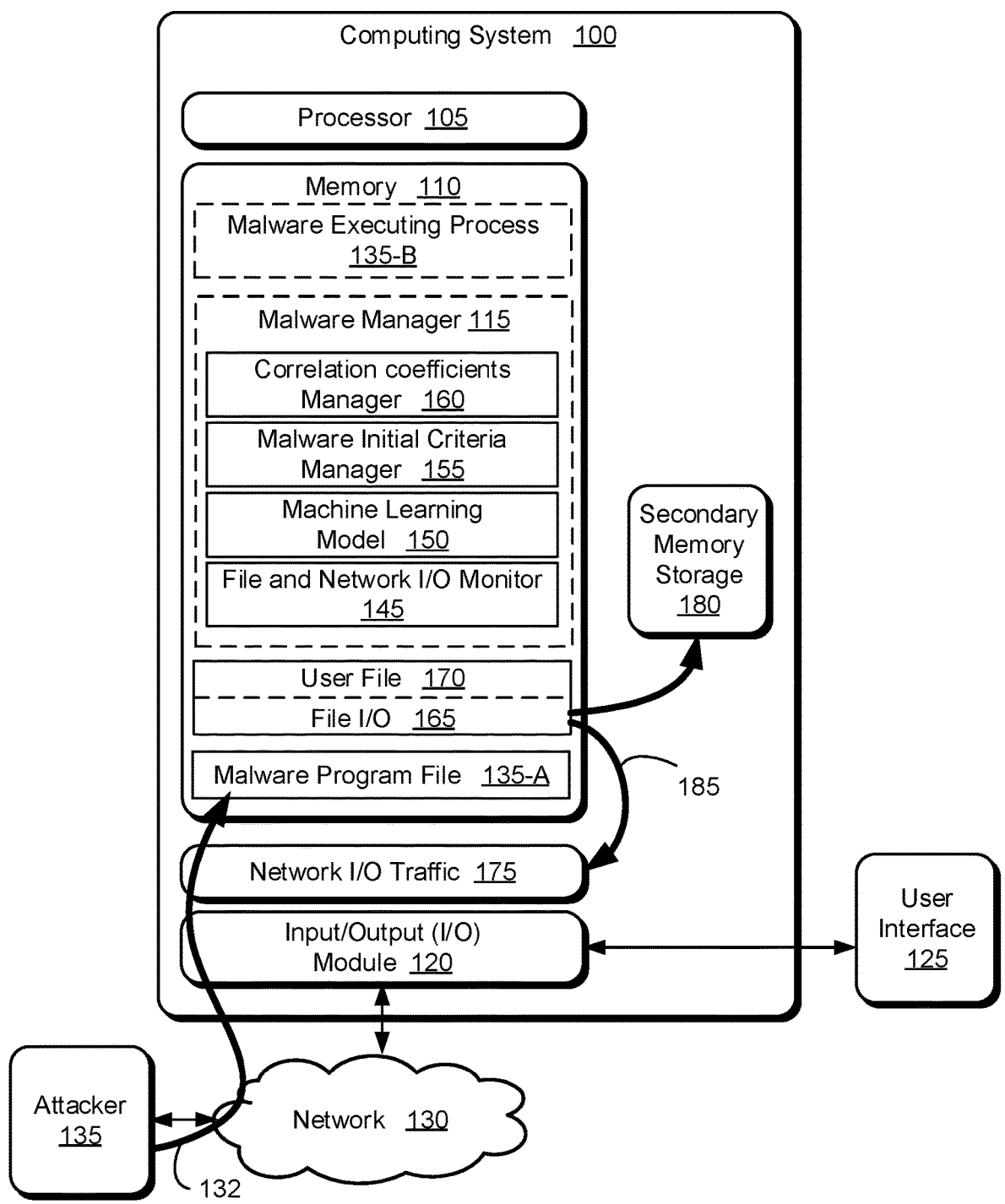
FIG. 1 is a block diagram illustrating an example malware manager in a computing system for detecting and managing malware using I/O correlation coefficients.

FIG. 1 is a block diagram illustrating an example malware manager in a computing system for detecting and managing malware, and particularly ransomware, using file I/O and network I/O traffic correlation coefficients. The computing system 100 includes a processor 105, memory 110, malware manager 115, and I/O module 120. The system communicates with a user interface 125 and a network 130 by way of an I/O module 120. As some non-limiting examples, the computing system 100 may be a server, desktop computer, notebook computer, mobile device, hand held device, mobile phone, or similar computer device. The processor 105 may be any central processing unit (CPU), with one or more cores. The memory 110 may be any non-transitory, machine-readable (e.g., computer/processor-readable) medium, such as a random access memory (RAM) or read only memory (ROM), or combination thereof, for storing program files, data, an operating system, and other executable instructions. The network 130 may be any local area network (LAN), wide area network (WAN), cloud, multi-cloud, hybrid cloud, or private on-premise cloud computing environment.

An attacker 135 represents a computer system or other entity that injects 132 a malware program source file 135-A into the computing system 100 by way of the network 130 and I/O module 120. In this example, the malware program source file 135-A is ransomware that is designed to gain unauthorized access to and control of the computing system 100 or its files or data. When the malware program source file 135-A becomes a malware executing process 135-B on the processor 105, it is designed to block access to the computing system, or the computing system files or data, using encryption technology on the files or data, unless a sum of money or other requirement is paid or made by the victim/user of the computing system. Although the malware program source file 135-A is discussed generally herein as ransomware, the principles of this disclosure are similarly applicable to other malware with appropriate considerations and adaptations, if needed.

The malware manager 115 includes instructions residing in the memory 110 for detecting and managing the malware program source file 135-A and its malware executing process 135-B. In this example, the malware manager 115 is depicted simply as instructions, such as firmware or software, in the memory 110 for execution on the processor 105. However, the operations of the malware manager 115 may be implemented in whole or in part using an application specific integrated circuit (ASIC), a system-on-a-chip (SoC), and/or other hardware components either alone or in combination with programming instructions executable by a processor.

In one example, the malware manager 115 includes a file and network I/O monitor 145, machine learning model 150, malware initial criteria manager 155, and correlation coefficients manager 160. Although these components are identified separately in this example, some may be combined or even further separated into additional components or modules as best suited to perform the functions described herein. The malware manager 115 detects and protects the computing system 100 from malware attacks, and particularly ransomware, based in part on a correlation between file I/O and coordinated network I/O traffic. File I/O and network I/O are monitored 145 to detect if such I/O meets initial (or first) criteria 155 indicative of malware. Such initial criteria may include detecting abnormal file I/O and network I/O activity, as well as detecting that the program source file 135-A, that is the source of the executing process 135-B, was recently created or downloaded or copied as an attachment from the network 130.

A machine learning model 150, such as a clustering technique, is applied to file I/O and network I/O in the system 100 to identify system-normal I/O activity. If the program file 135-A was recently created, and there is abnormal I/O activity associated with a file in the computing system responsive to the executing process 135-B, such as user file 170, or other system or data file, then correlation coefficients are calculated 160 with respect to the file I/O and coordinated network traffic I/O. If the correlation coefficients meet a threshold criteria (meaning meet or exceed a threshold), in consideration with other detected file operation event activity or network I/O factors, then it is determined that a malware or ransomware attack has been targeted on the computing system and action may be taken to protect the system as described subsequently herein.

Considering further detail now, the file and network I/O monitor 145 periodically monitors file I/O 165 with respect to files used in the system, such as user file 170, as initiated by an executing process—in this example malware executing process 135-B. The file and network I/O monitor 145 also monitors network I/O traffic 175 occurring in and out of the system via the I/O module 120, relative to the file being monitored 170 and the executing process 135-B that initiated the file and network I/O. File I/O can be scanned through file I/O notifications such as are available in operating system subsystems, for example the inotify Linux kernel subsystem, or special interrupt handlers for I/O, or by way of layer hooks as available, for example, in the Linux virtual file system (VFS). How often the file and network I/O monitor 145 will periodically monitor file and network I/O may be determined by factors such as system parameters, design, performance restrictions, and other considerations including, for example, processing power, load balancing, memory usage and availability, and malware threat factors. For purposes of this disclosure, periodically executing a function, such as monitoring the file and network I/O activity, or running the machine learning model, means executing the function at times, anywhere on the time spectrum, ranging from occasionally to continuously as design criteria and system parameters allow.

The file and network I/O monitor 145 may also copy the data bytes upon reading of a file being monitored, such as user file 170, to a backup memory or secondary storage location 180 when monitoring is initiated. The data bytes are copied to the backup location to protect the file data if it is later determined that the file is under attack from a malware executing process 135-B. The secondary memory/storage 180 may include various implementations of RAM, ROM, or other types of non-volatile memory such as a solid-state drive (SSD) or a hard disk drive (HDD), or combinations thereof. Additionally, the file and network I/O monitor 145 identifies a network end-point 135 for the monitored file's 170 network I/O traffic 175. In this example, the network end-point for the monitored file's network I/O traffic is the attacker's computer system 135 which injected the malware program file 135-A, although it could be any other system not associated with the source of the attack. Identifying this network end-point allows the malware manager 115 to subsequently block transmission of data to the network end-point in an event the executing process 135-B is identified as malware.

The machine learning model 150 is trained to identify and classify system-normal file I/O and coordinated network I/O traffic in the computing system 100. To classify a baseline for system-normal file I/O and network I/O, an unsupervised clustering based technique may be used, such as density-based spatial clustering of applications with noise (DBSCAN), to group an unlabeled data set. Additionally, a supervised model such as One-Class SVM, One-Class Neural Network, Autoencoder, or Generative Adversarial Network (GAN) may be used to build a suitable final model to be applied to detect normal activity and outliers (abnormalities) in the file I/O and network traffic I/O. This learning method effectively enables the detection of an anomaly in file I/O and network I/O traffic, e.g., abnormal file and network I/O, indicative of a potential malware attack, and also helps prevent false positive instances of abnormal file and network I/O.

The machine learning model 150 may be run periodically to maintain an updated model of normal and abnormal file I/O and network I/O traffic. Example features for the machine learning model 150 include: (1) identifying whether file I/O is normal or abnormal by considering (i) inter-arrival time of a data chunk, and it's mean and variance, as well as (ii) the data chunk size, and its mean and variance, and (2) identifying whether network I/O is normal or abnormal by considering (i) inter-arrival time of outgoing & incoming data packets for an identified end-point, and the data packets mean and variance, (ii) the length of the data packet, and its mean and variance, and (iii) bytes arrival or bytes sent per second (or some other applicable time frame).

The malware initial criteria manager 155 detects whether an executing process 135-B meets initial (or first) criteria that is indicative of the process potentially being malware. One component of the initial criteria is to detect whether the program source file 135-A was recently created within a threshold time period. A recently created file may be indicative of recently injected malware. Another component of the initial criteria may be that a monitored file I/O 165, e.g., for the user file 170, and the coordinated network I/O traffic for that file, is abnormal relative to the system-normal baseline as previously established by the machine learning model 150. One or both of these criteria may be considered by the malware initial criteria manager 155 to detect whether the executing process 135-B and its program source file 135-A may potentially be malware, and specifically ransomware in this example. If the executing process 135-B meets this initial criteria (meaning meets or exceeds the criteria), then it is determined that the executing process 135-B may potentially be malware along with its program source file 135-A.

After the malware initial criteria manager 155 determines that the executing process 135-B meets the initial criteria indicating that it may be malware, then the correlation coefficients manager 160 calculates one or more correlation coefficients with respect to the file I/O 165 and network I/O traffic 175 initiated by the executing process 135-B. In one example, a correlation coefficient is calculated with respect to (i) a first set of data read from the file being monitored 170 as detected from the file I/O 165, and (ii) a second set of data written to the file (or to a second file) as detected from the file I/O. A correlation coefficient may also be calculated, or a second correlation coefficient may be calculated, with respect to (i) a third set of data identifying a file operation event associated with the file 170, and (ii) a fourth set of data associated with the file as detected from the coordinated network I/O traffic 175 as the file, or meta-data associated with the file, or command-and-control (C & C) server traffic managed by the attacker 135, is being transmitted either way over the network 130 (e.g., sent to or received from the network). A file operation event associated with the file 170 may include any one of a file open, read, write, close, delete, rename, move, copy, modify, truncate, directory file listing, meta-data read/write, or other operation.

To determine if the program file 135-A and executing process 135-B is malware, a threshold criteria is then considered including evaluating the correlation coefficients and, optionally, one or more additional factors, such as a file operation event and/or network traffic associated with the file. If the threshold criteria is met, then the executing process 135-B and its program source file 135-A are identified as malware or, in this example, as ransomware.

The correlation coefficients are effective factors to consider in identifying malware or ransomware because once the malware 135-A is downloaded to the victim computing system 100, then during execution (an attack) the malware process 135-B communicates to its C & C server managed by the attacker 135. The communication may be for metadata, file content transfer, an encryption key, control commands, connection traffic, or other purposes. The correlation coefficients indicate that the file I/O is tied with coordinated network I/O traffic because the attack may transmit metadata information (e.g., encryption keys) of the file 170 being encrypted by the ransomware, or the ransomware may transmit the whole encrypted file itself. In this context, as some variants of ransomware may transfer the file content, but some may not, a single correlation coefficient may not always hold true. Thus, calculating a first and/or a second correlation coefficient, and considering file operation(s) event(s) such as a file delete, rename, move, copy, modify, or truncate, and considering network traffic in association with the correlation coefficient(s), a threshold criteria is identified that provides a reliable opportunity to detect the malware.

If the threshold criteria is met, identifying the executing process 135-B and program source file 135-A as ransomware, then action may be taken by the malware manager 115 to manage the malware in the computing system 100. Example non-limiting actions may include blocking an opening of any new files by the executing process 135-B, allowing a completion of any read, write, and backup activity for any currently opened files, notifying a user of the computing system, stopping (e.g., killing) execution of the process, archiving the malware program file 135-A in a secure vault or removing it from the memory, disk, or storage completely, blocking a transmission of data to a network end-point 135 of the network I/O traffic, providing attack information to other networked computing devices so they may take preventative measures, or any combinations thereof.

If a coordinated ransomware attack is being done in a network of computing devices (e.g. via botnet) then the vital information relating to the attack, such as the signature of the malware program file 135-A or executing process 135-B, name of the file, location of the file, and pattern parameters of the ransomware file I/O and network I/O traffic, may be shared to other nodes in the network so that they can more easily detect the potential attack and prevent any further damage. The signature of the malware program file or executing process may include aspects such as, for example, the machine learning model, network ports used, correlation coefficients calculated, variances of the I/O inter-arrival times, size of the malware program file, number of threads running, total memory occupied, cryptographic hash of the file, or memory mapping of the malware program file object code. Additionally, network end-point information associated with the ransomware may also be shared to other nodes which can help in blocking the malware related traffic. If certain file operation events are detected as coordinated through the malware executing process, additional measures may also be taken to protect the file (as discussed subsequently herein).

Figure 2:
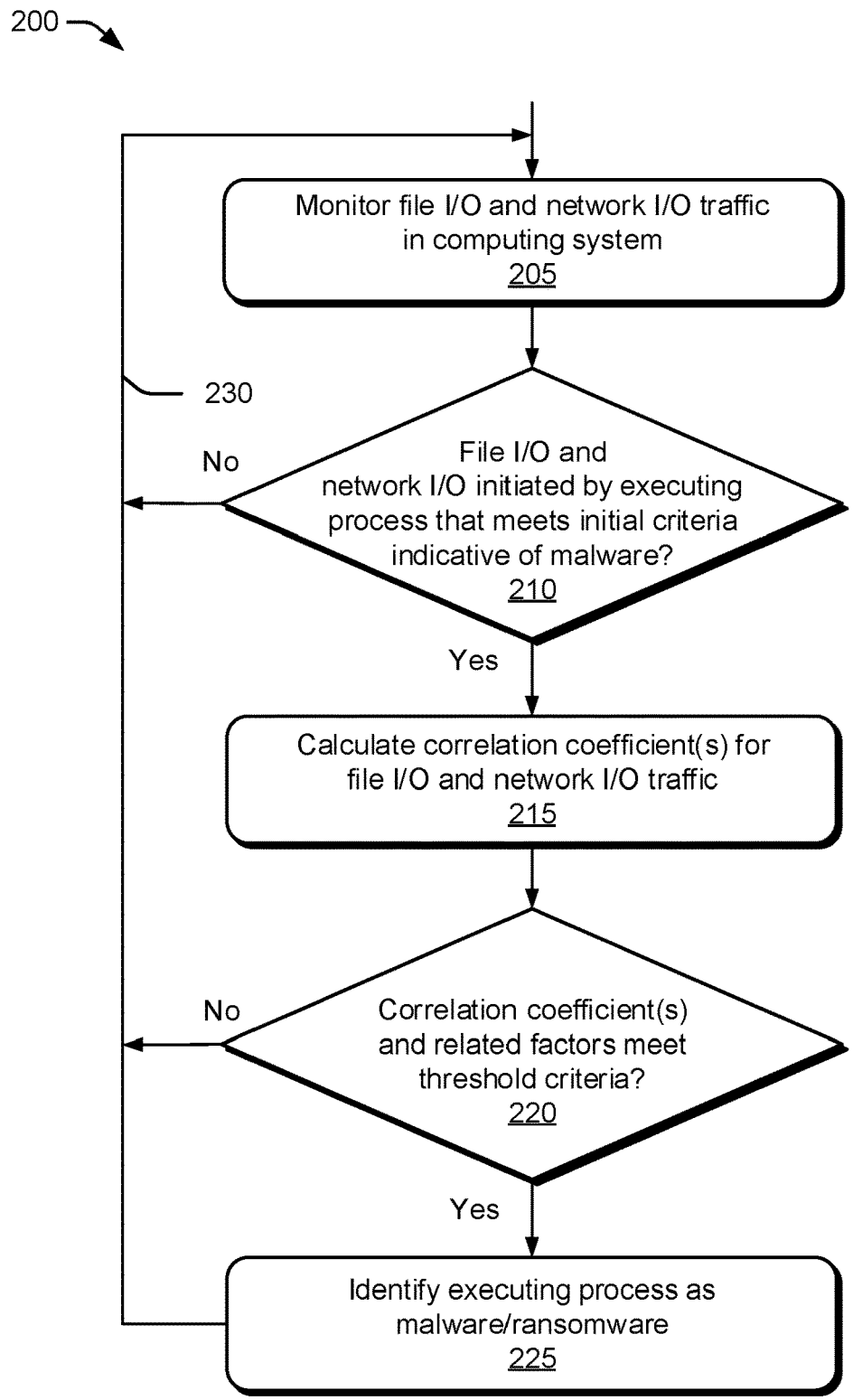
FIG. 2 is flow chart illustrating an example high level method of detecting and managing malware using I/O correlation coefficients in a computing system.
Figure 3:
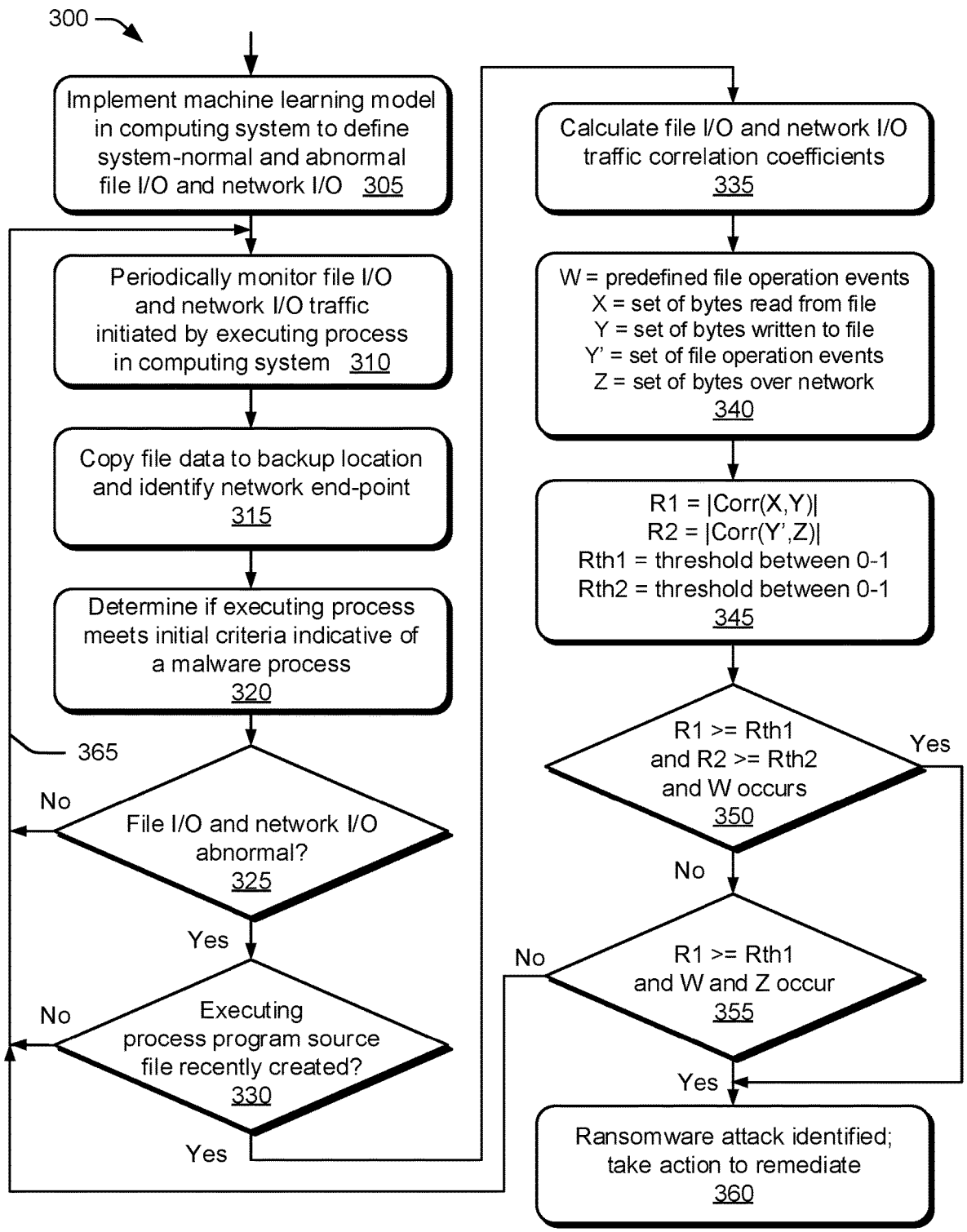
FIG. 3 is flow chart illustrating an example method of detecting and managing malware using I/O correlation coefficients in a computing system.
Figure 4:
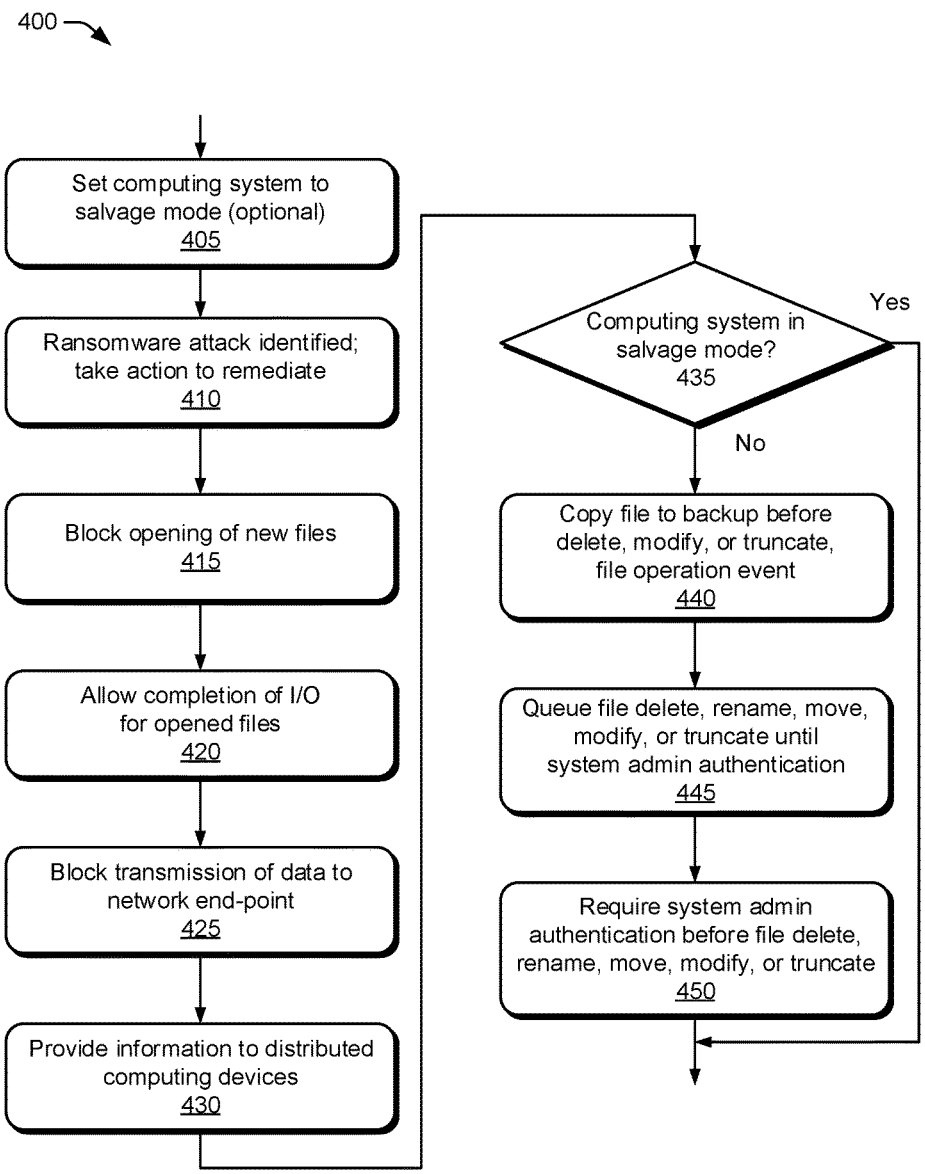
FIG. 4 is flow chart illustrating an example method of managing a computing system for preventing deletion of files attacked by malware and for taking action responsive to a malware attack detected using I/O correlation coefficients.

FIGS. 2-4 are flow charts illustrating example methods 200, 300, 400 of detecting and managing malware using I/O correlation coefficients in a computing system. The system and/or operations of these methods may be embodied in whole or in part as programming instructions, such as firmware or software, stored on a non-transitory, machine-readable (e.g., computer/processor-readable) medium, such as a RAM or ROM memory for execution on a processor in a computing device or devices. In some examples, implementing the operations of these methods may be achieved by a processor reading and executing the programming instructions stored in the memory. In other examples, implementing the operations of the methods may be achieved using an ASIC and/or other hardware components either alone or in combination with programming instructions executable by a processor in a computing device or devices.

The example methods 200, 300, 400 may include more than one implementation, and different implementations may not employ every operation presented in the respective flow diagram, or may employ additional steps not shown. Therefore, while the operations of the methods are presented in a particular order within the flow diagrams, the order of their presentations is not intended to be a limitation as to the order in which the operations may actually be implemented, or as to whether all of the operations may be implemented. For example, one implementation might be achieved through the performance of a number of initial operations, without performing one or more subsequent operations, while another implementation might be achieved through the performance of all of the operations.

Referring now to FIG. 2, method 200 depicts a high-level example of detecting and managing malware using file I/O and coordinated network I/O correlation coefficients. At 205, file I/O and coordinated network I/O traffic are periodically monitored in a computing system. At 210, query whether a file's I/O and its network I/O that is being monitored is initiated by an executing process that meets initial criteria indicative of malware. If the executing process does not meet the initial criteria, then execution control flow returns 230 to monitoring another file I/O and related network I/O traffic to identify a potential malware attack.

The executing process may meet the initial criteria 210 of being malware, or in this example ransomware, if its program source file was recently created within a threshold time period, which is potentially indicative of recently injected malware. The executing process may also satisfy the initial criteria of being malware if the I/O of the file as initiated by the executing process, and the coordinated network I/O traffic for that file, is abnormal I/O relative to system-normal I/O activity in the computing system. Meeting one or both of these criteria indicates that the executing process and its program source file may potentially be malware, and specifically ransomware in this example. In one example, normal I/O and abnormal I/O for the computing system is determined by a machine learning model. For example, an unsupervised clustering based technique may be used to group a data set, and then a supervised model may be used to build a final model of system-normal and abnormal I/O in the computing system, in order to detect abnormal file I/O and network traffic I/O for a specific file in the computing system.

If it is determined that the file I/O and coordinated network I/O is initiated by an executing process that meets the initial criteria indicative of malware 210, then one or more correlation coefficients are calculated 215 with respect to the file I/O and network I/O traffic initiated by the executing process. In one example, a correlation coefficient is calculated with respect to (i) a first set of data read from the file being monitored as detected from the file I/O, and (ii) a second set of data written to the file (or a second file) as detected from the file I/O. A correlation coefficient may also be calculated, or a second correlation coefficient may be calculated, with respect to (i) a third set of data identifying a file operation event associated with the file, and (ii) a fourth set of data associated with the file as detected from the coordinated network I/O traffic as the file, or meta-data associated with the file, or C & C server traffic managed by the attacker, is being transmitted either way over the network (e.g., sent to or received from the network).

At 220, if the correlation coefficient(s) and, optionally, one or more additional factors, such as a file operation event and/or network traffic associated with the file, do not meet a threshold criteria, then malware is not detected and execution control returns 230 to monitoring file I/O and network I/O to identify another potential malware attack. If the correlation coefficient(s) and additional factors meet a threshold criteria 220, then the executing process and its program source file are identified as malware or, in this example, as ransomware 225. In response, action may be taken to manage the malware/ransomware in the computing system as described above in reference to FIG. 1.

Referring now to FIG. 3, method 300 depicts a more detailed example of detecting and managing malware in a computing system, and more particularly ransomware in this example, using file I/O and coordinated network I/O correlation coefficients. At 305, a machine learning model is trained and implemented to identify and define system-normal file I/O and coordinated network I/O traffic in a computing system. This system-normal file I/O and network I/O activity of the computing system will be used later for comparison against a specific file I/O and network I/O activity initiated by an executing process. In an event the specific file I/O and network I/O associated with the executing process does not meet the system-normal file I/O and network I/O activity identified by the machine learning model, then the specific file I/O and network I/O activity is categorized as an abnormal file I/O and network I/O activity.

An unsupervised clustering based technique may be used, such as density-based spatial clustering of applications with noise (DBSCAN), to group an unlabeled data set of file I/O and coordinated network I/O. A supervised model such as One-Class SVM, One-Class Neural Network, Autoencoder, or Generative Adversarial Network (GAN) may be used to build a suitable final model to be applied to detect outliers (abnormalities) in the file I/O and network traffic I/O. This learning method effectively enables the detection of an anomaly in file I/O and network traffic, e.g., abnormal file I/O and network I/O, indicative of a potential malware attack, and also helps prevent false positive instances of abnormal file I/O and network I/O.

The machine learning model may be run periodically 305 to maintain an updated model of system-normal file I/O and coordinated network I/O traffic data. Example features for the machine learning model may include: (1) identifying whether file I/O is normal or abnormal by considering (i) inter-arrival time of a data chunk, and it's mean and variance, as well as (ii) the data chunk size, and its mean and variance, and (2) identifying whether network I/O is normal or abnormal by considering (i) inter-arrival time of outgoing & incoming data packets for an identified network end-point, and the data packets mean and variance, (ii) the length of the data packet, and its mean and variance, and/or (iii) bytes arrival or bytes sent per second (or some other applicable time frame).

At 310, file I/O and coordinated network I/O traffic are periodically monitored as initiated by an executing process in the computing system. File I/O can be scanned through file I/O notifications such as are available in operating system subsystems, for example the inotify Linux kernel subsystem, or special interrupt handlers for I/O, or by way of layer hooks as available, for example, in the Linux virtual file system (VFS). How often the file and network I/O is periodically monitored may be determined by factors such as system parameters, design, performance restrictions, and other considerations including, for example, processing power, load balancing, memory usage and availability, and malware threat factors.

At 315, the file I/O and coordinated network I/O data bytes being monitored may be copied to a backup memory or secondary storage location to protect the file data if it is later determined that the file is under attack from the executing process actually being malware. Additionally, a network end-point for the monitored file's network I/O traffic may be identified to subsequently block transmission of data to the network end-point in an event the executing process is identified as malware.

At 320, query whether the executing process, which is causing the file I/O and coordinated network I/O being monitored, meets initial (or first) criteria indicative of being malware, or in this example ransomware. One initial criteria indicator or component of being ransomware in this example is if the file I/O and coordinated network I/O traffic is abnormal 325 relative to system-normal I/O activity as measured by the machine learned model. If the executing process causing this I/O does not meet this abnormal I/O indicator component of initial criteria 325, then execution control flow returns 365 to monitoring another file I/O and coordinated network I/O traffic, relative to another executing process, to continue seeking to identify a potential malware attack.

Another initial criteria indicator or component of being ransomware is if the executing process program source file was recently created within a threshold time period 330. A recently created program source file is potentially indicative of recently injected malware. If the executing process does not meet this indicator component of initial criteria 330, then execution control flow returns 365 to monitoring another file I/O and coordinated network I/O traffic, relative to another executing process, to continue seeking to identify a potential malware attack.

If it is determined that the file I/O and coordinated network I/O is initiated by an executing process that meets the initial criteria indicative of malware 325, 330, then correlation coefficients are calculated 335 with respect to the file I/O and network I/O traffic initiated by the executing process. In one example, a correlation coefficient is calculated with respect to (i) a first set of data read from the file being monitored as detected from the file I/O, and (ii) a second set of data written to the file (or a second file) as detected from the file I/O. A correlation coefficient may also be calculated, or a second correlation coefficient may be calculated, with respect to (i) a third set of data identifying a file operation event associated with the file, and (ii) a fourth set of data associated with the file as detected from the coordinated network I/O traffic as the file, or meta-data associated with the file, or C & C traffic managed by the attacker is being transmitted either way over the network (e.g., sent to or received from the network). A file operation associated with the file may include any one of an open, read, write, rename, move, copy, modify, truncate, close, delete, file listing, meta-data read, or other operation.

At 340, data considered for calculating correlation coefficients and threshold criteria for detecting malware may include the following: Let W be a file operation event of delete, rename, move, modify, or truncate; these file modification operation events are considered because malware or ransomware may initiate any of these functions in effort to control the file, such as by deleting or renaming the file, or reading file content and writing encrypted content to the same file, or truncating the file, and then renaming the file; other file operation events may also optionally be included; Let X be the set of bytes read from the file as detected from the file I/O;
Let Y be the set of bytes written to the file (or to a second file) as detected from the file I/O;
Let Y' be the broad set of file operation events of open, read, write, close, delete, rename, move, copy, modify, truncate, directory file listing, meta-data read/write, or other file operation event; and
Let Z be the set of bytes (of file content, file meta-data, or C & C traffic) transmitted over the network (either sent to or received from the network) as detected from the network I/O.

Then, at 345, the following correlation coefficients and thresholds are calculated as follows:

$$R1=|Corr(X, Y)|;$$

$$R2=|Corr(Y', Z)|;$$

Rth1 is a defined as a threshold between 0 and 1; and
Rth2 is defined as a threshold between 0 and 1.

In considering this data and correlation coefficients, a file operation event W and coordinated network I/O traffic Z generally exist during a ransomware attack. Additionally, if Z has no file data then it may have file meta-data or simply C & C traffic, like getting an encryption key, or other control commands, or simply connection keep-alive traffic. We don't need to dissect the network traffic, but depending upon the presence or absence of file data in Z, the correlation function Corr(Y, Z) may have varying values or there may not be correlation at all. Therefore, to make the test condition more complete, we also consider the function Corr(Y', Z) which covers more of the events or actions associated with ransomware, as this correlation is between file operations and network I/O. This also helps to avoid false positives.

At 350, one example threshold criteria for detecting malware (ransomware in this example) is defined as follows: if R1>=Rth1, and R2>=Rth2, and a file operation event W occurs, then the executing file is causing a ransomware attack in the computing system 360, and action may be taken to remediate the issue. On the other hand, if this threshold criteria is not met, then no ransomware attack is identified and execution control flow returns 365 to monitor another file I/O and coordinated network I/O traffic, relative to another executing process, to continue seeking to identify a potential malware attack.

At 355, another example threshold criteria for detecting malware is defined as follows: if R1>=Rth1, and a file operation event W occurs, and coordinated network I/O traffic Z occurs, then the executing file is causing a ransomware attack in the computing system 360, and action may be taken to remediate the issue. On the other hand, if this threshold criteria is not met, then no ransomware attack is identified and execution control flow returns 365 to monitor another file I/O and coordinated network I/O traffic, relative to another executing process, to continue seeking to identify a potential malware attack.

FIG. 4 is a flow chart illustrating an example method of managing a computing system for preventing deletion of files attacked by malware, and particularly ransomware, and for taking action responsive to an identified attack as detected using the above discussed I/O correlation coefficients and threshold criteria. At 405, the computing system can optionally be set to a salvage mode upon initialization, or at some other time, so that any attempted file delete, rename, move, or truncate operation does not actually delete or otherwise severely impact the file and the file always remains recoverable even if attacked by malware. At 410, if a malware or ransomware attack is identified as discussed above using I/O correlation coefficients and threshold criteria, then the following actions, either some or all, may be taken to remediate the impact. At 415, the opening of any new files by the executing process may be blocked to protect those files. At 420, completion of any read, write, and backup activity I/O for any currently opened files may be allowed to complete. At 425, the transmission of data to the network end-point may be blocked, identified relative to the executing process causing the network I/O traffic. At 430 information relating to the malware may be provided to other networked nodes or computing devices so they may take preventative measures (see examples in the above discussion of FIG. 1).

At 435, if it is determined that the computing system is not in salvage mode, and if a file operation event W is detected (e.g., when a file modification operation event of delete, rename, move, modify, or truncate call reaches the operating system), then the file may be protected by taking one or more of the following actions. At 440, the file may be copied to a predetermined safe backup location before deleting, modifying, or truncating the file, or other operation deemed to potentially significantly impact the file. At 445, file modification calls may be queued, such as delete, rename, move, modify, or truncate, but the respective call is returned as a success to the caller, then the operating system can process the requested operation of all the queued files later after confirming with the system administrator. At 450, a password or multi-factor authentication may be required from the system administrator before performing any file delete, rename, move, modify, or truncate operation, or other operation deemed to potentially significantly impact the file. On the other hand, at 435, if the computing system is in salvage mode, then none of the remaining steps need to be performed (e.g., no need for copying the file before deleting, modifying, or truncating it 440, or queuing the respective file modification request 445, or requiring system admin authentication before deleting, renaming, moving, modifying, or truncating the file 450).

While this disclosure has been described with respect to example embodiments outlined above, it is evident that alternatives, modifications and variations will be apparent to those skilled in the art. Accordingly, the described and depicted examples of the present disclosure are intended to be illustrative, not limiting, and the subject of the appended claims is not necessarily limited to the specific features or methods described herein.

What is claimed is:

1. A method of detecting malware in a computing system, comprising:
monitoring, by a device, a first file input/output and a coordinated network input/output traffic in the computing system;
detecting that the first file input/output and the coordinated network input/output traffic are initiated by an executing process that meets a first criteria indicative of malware;
calculating a correlation coefficient, with respect to the first file input/output and coordinated network input/output traffic initiated by the executing process, in an event that the executing process meets the first criteria indicative of malware; and
identifying the executing process as malware in an event that a second threshold criteria is met comprising the correlation coefficient.

2. The method of claim 1 wherein the malware comprises at least one of a ransomware, virus, trojan, worm, adware spyware, or combinations thereof.

3. The method of claim 1 further comprising at least one of copying a data content of a first file to a backup location, identifying a network end-point for the coordinated network input/output traffic, or a combination thereof.

4. The method of claim 1 wherein the first criteria indicative of malware comprises at least one of a program source file of the executing process being recently created within a threshold time period, the executing process causing an abnormal file input/output activity associated with a first file input/output activity, the executing process causing an abnormal network input/output activity associated with a network input/output activity, or combinations thereof.

5. The method of claim 1 further comprising applying a machine learning model to the computing system to identify a system-normal file input/output and network input/output activity of the computing system.

6. The method of claim 5 wherein the machine learning model comprises a clustering based technique, a supervised method, or a combination thereof.

7. The method of claim 5 wherein, in an event the first file input/output and coordinated network input/output does not meet the system-normal file input/output and network input/output activity identified by the machine learning model, then the first file input/output and coordinated network input/output activity is categorized as an abnormal first file input/output and coordinated network input/output activity and defines a component of the first criteria indicative of malware.

8. The method of claim 1 wherein the correlation coefficient is calculated with respect to at least one of:
a first set of data read from a first file as detected from the first file input/output, and a second set of data written to the first file or a second file as detected from the first file input/output; or
a third set of data identifying a file operation associated with the first file, and a fourth set of data associated with the first file as detected over a network from the coordinated network input/output traffic.

9. The method of claim 8 wherein the correlation coefficient comprises at least one of:
a first correlation coefficient calculated with respect to the first set of data and the second set of data;
a second correlation coefficient calculated with respect to the third set of data and the fourth set of data; or
a combination thereof.

10. The method of claim 9 wherein the second threshold criteria is met comprising the correlation coefficient in an event that the first correlation coefficient meets a first correlation threshold value, the second correlation coefficient meets a second correlation threshold value, and a file operation event is detected with respect to the first file input/output.

11. The method of claim 9 wherein the second threshold criteria is met comprising the correlation coefficient in an event that the first correlation coefficient meets a first correlation threshold value, a file operation event occurs with respect to the first file input/output, and the fourth set of data associated with the first file is detected over the network from the coordinated network input/output traffic.

12. The method of claim 1 further comprising, in an event that the executing process is identified as malware, initiating at least one of:
blocking an opening of any new files by the executing process;
allowing a completion of any read, write, and backup activity for any currently opened files in the computing system;
blocking a transmission of data to a network end-point of the coordinated network input/output traffic;
providing information relating to the malware to distributed networked computing devices to take preventative measures; or
combinations thereof.

13. The method of claim 1 further comprising:
queueing a file operation delete call for the first file, returning the file operation delete call as a success, then deleting the first file after confirming with a system administrator of the computing system;
requiring an authentication from the system administrator before deleting the first file;
copying the first file to a safe location before deleting it;
pre-setting the computing system into a salvage mode so that the first file is not deleted and remains recoverable; or
combinations thereof.

14. A malware management system for managing malware in a computing system comprising at least one processor and instructions that when executed by the at least one processor cause the at least one processor to:
monitor a first file input/output and a coordinated network input/output traffic in the computing system;
detect that the first file input/output and the coordinated network input/output traffic are initiated by an executing process that meets first criteria indicative of malware;
calculate a correlation coefficient, with respect to the first file input/output and coordinated network input/output traffic initiated by the executing process, in an event that the executing process meets the first criteria indicative of malware; and
identify the executing process as malware in an event that a second threshold criteria is met comprising the correlation coefficient.

15. The system of claim 14 wherein the first criteria indicative of malware comprises at least one of a program source file of the executing process being recently created within a threshold time period, the executing process causing an abnormal file input/output activity associated with a first file input/output activity, the executing process causing an abnormal network input/output activity associated with a network input/output activity, or combinations thereof.

16. The system of claim 14 further comprising instructions that when executed by the at least one processor cause the at least one processor to apply a machine learning model to the computing system to identify a system-normal file input/output and network input/output activity of the computing system, and in an event that the first file input/output and coordinated network input/output does not meet the system-normal file input/output and network input/output activity, then the instructions, when executed by the at least one processor, cause the at least one processor to categorize the first file input/output and coordinated network input/output activity as an abnormal first file input/output and coordinated network input/output activity indicative of defining a component of the first criteria indicative of malware.

17. The system of claim 14 wherein the correlation coefficient is calculated with respect to at least one of:
   a first set of data read from a first file as detected from the first file input/output, and a second set of data written to the first file or a second file as detected from the first file input/output; or
   a third set of data identifying a file operation event associated with the first file, and a fourth set of data associated with the first file as detected over a network from the coordinated network input/output traffic.

18. The system of claim 17 wherein the correlation coefficient comprises at least one of:
   a first correlation coefficient calculated with respect to the first set of data and the second set of data;
   a second correlation coefficient calculated with respect to the third set of data and the fourth set of data; or
   a combination thereof.

19. The system of claim 18 wherein the second threshold criteria is met comprising the correlation coefficient in an event of at least one of:
   the first correlation coefficient meets a first correlation threshold value, the second correlation coefficient meets a second correlation threshold value, and a file operation event is detected with respect to the first file input/output; or
   the first correlation coefficient meets a first correlation threshold value, a file operation event occurs with respect to the first file input/output, and the fourth set of data associated with the first file is detected over the network from the coordinated network input/output traffic.

20. A non-transitory machine-readable storage medium storing instructions that when executed by at least one processor cause the at least one processor to:
   monitor a first file input/output and a coordinated network input/output traffic in the computing system;
   detect that the first file input/output and the coordinated network input/output traffic are initiated by an executing process that meets initial criteria indicative of malware;
   calculate a correlation coefficient, with respect to the first file input/output and coordinated network input/output traffic initiated by the executing process, in an event that the executing process meets the initial criteria indicative of malware; and
   identify the executing process as malware in an event that a second threshold criteria is met comprising the correlation coefficient.

\* \* \* \* \*